United States Patent [19]

Kozuki et al.

[11] Patent Number: 4,599,660
[45] Date of Patent: Jul. 8, 1986

[54] VIDEO SIGNAL REPRODUCING APPARATUS

[75] Inventors: Susumu Kozuki, Tokyo; Hiroyuki Takimoto, Kanagawa; Hiroo Edakubo, Tokyo; Nobutoshi Takayama, Kanagawa, all of Japan

[73] Assignee: Canon Kabushiki Kaisha, Tokyo, Japan

[21] Appl. No.: 573,368

[22] Filed: Jan. 24, 1984

[30] Foreign Application Priority Data

Jan. 27, 1983 [JP] Japan ................... 58-12256

[51] Int. Cl.$^4$ .............................................. G11B 5/56
[52] U.S. Cl. .......................................................... 360/77
[58] Field of Search ...................................... 360/77, 78

[56] References Cited

U.S. PATENT DOCUMENTS 4,497,000 1/1985 Terada et al. ........................ 360/70

FOREIGN PATENT DOCUMENTS 58-159260 9/1983 Japan ..................................... 360/78

*Primary Examiner*—George G. Stellar
*Attorney, Agent, or Firm*—Toren, McGeady, Stanger, Goldbert & Kiel

[57] ABSTRACT

A video signal reproducing apparatus which reproduces a video signal from many evenly spaced recording tracks formed on a recording medium, comprises:
a first rotating head;
a second rotating head which has a larger width than the first rotating head and which traces the recording tracks alternately with the first rotating head;
detecting apparatus for detecting the positional errors of the first and second rotating heads relative to one of the recording tracks by using the outputs of these heads;
adjusting apparatus for adjusting, on the basis of the difference in head width between the first and second rotating heads, the output of the detecting apparatus related to the second rotating head;
recording medium moving apparatus for moving the recording medium in a direction which intersects the recording tracks; and
control apparatus for controlling the moving apparatus on the basis of the output of the detecting means adjusted by the adjusting apparatus.

19 Claims, 12 Drawing Figures

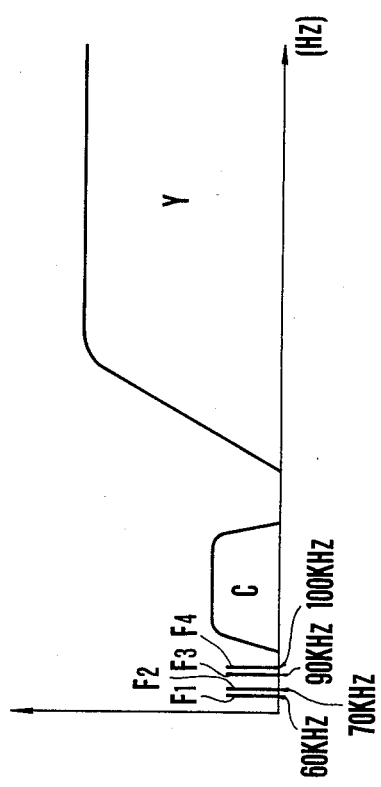
FIG.3
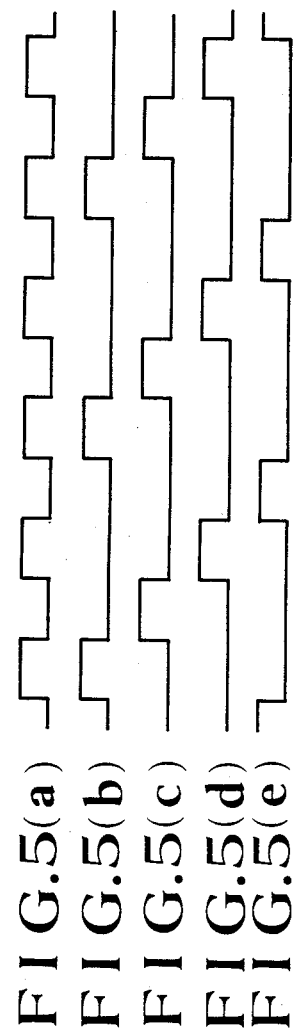
FIG.5(a)
FIG.5(b)
FIG.5(c)
FIG.5(d)
FIG.5(e)

VIDEO SIGNAL REPRODUCING APPARATUS

BACKGROUND OF THE INVENTION

1. Field of the Invention

This invention relates to a video signal reproducing apparatus and more particularly to an apparatus which reproduces, by means of two heads, a video signal from many evenly spaced recording tracks formed on a recording medium.

2. Description of the Prior Art

In the following description, magnetic recording/reproducing apparatus of the rotary two-head helical scanning type (hereinafter called VTR), to which the present invention is advantageously applicable, will be discussed by way of example.

A tendency toward density recording performed with high density on a magnetic tape with a VTR has advanced during recent years. Accordingly, the width of recording tracks has in general been reduced. As a result, the necessity for automatic tracking control hs increased for accurately determining the position of a magnetic head relative to a magnetic tape. It is also necessary that a magnetic head accurately scan and reproduce a record from the recording tracks on the magnetic tape during reproduction. A method for automatic tracking, which has recently become popular, is as follows: A pilot signal is recorded in each recording track and is superimposed on a video signal recorded there. In reproducing the record, the pilot signal levels reproduced from adjacent recording tracks loacted behind and in front of a recording track being traced for reproduction are compared, thereby forming a tracking signal. Then, the magnetic tape travel is controlled based on this signal.

Meanwhile, there have been proposed and practicalized VTR's of a different kind having two rotating heads, which are called unbalanced type heads. These two rotating heads have different head widths for reducing a noise bar produced during video signal reproduction at a varied speed for still picture reproduction, slow motion picture reproduction, or the like. The VTR using such unblanced heads must have overlapped recording tracks for uniform recording track width at the time of recording. Therefore, in VTR's of this kind, the two heads secured to a rotary cylinder must have their end surfaces on one side aligned with each other in their travelling direction. If the above automatic tracking method is applied to a VTR using such unbalanced heads, control over the magnetic tape travel causes the center line of the recording tracks to be traced by the centers of the heads. However, in VTR's of this knid, the operation of a control system becomes unstable with the magnetic tape travel controlled in such a manner as to have the centers of both the heads trace the center line of the recording track because, as mentioned above, the two heads have their end surfaces on one side aligned in their travelling direction this means that their center lines are not aligned with each other. In other words, the rotating surfaces at the centers of these two heads deviate from each other in the direction of the axis of rotation. Therefore, the controlled object of the magnetic tape travel control changes every time one reproducing head is switched over to another. Therefore, a control signal varies at the time head switch-over if control is performed in such a way as to have the center line of the recording track traced by the centers of both of the heads. This results in an unstable control system. Furthermore, even when the rotating surface at the center of one head is the same as that of the other, the difference in head width varies the control signal of the above tracking method at the switch-over time from one head to the other and, thus, renders the control system unstable.

It is possible to slove this problem by processing the above tracking signal through a low-pass filter of a low time constant or through a comb-shaped filter, which removes a frequency component related to the period of head switch-over before the signal is used for control of the magnetic tape travel. However, if the rotating surfaces of the centers of the two heads greatly deviate from the direction of the axis rotation, the two heads and particularly the one having a narrower head width would not track satisfactory.

It is therefore a general object of the present invention to eliminate the shortcomings of the prior art apparatus mentioned in the foregoing.

It is a more specific object of the invention to provide a video signal reproducing apparatus which eliminates the unstableness of a control system for the travel of a recording medium attributable to the difference in head width between the two heads.

It is another object of the invention to provide a video signal reproducing apparatus which eliminates the unstableness of a recording medium travel control system attributable to deviation of the rotating surfaces at the centers of the two heads in the direction of the axis of rotation.

It is a further object of the invention to provide a video signal reproducing apparatus which is capable of controlling the movement of a recording medium to ensure that the two heads always perform satisfactory reproduction.

SUMMARY OF THE INVENTION

To attain these objects, a video signal reproducing apparatus according to the invention in a preferred embodiment thereof comprises a first rotating head and a second rotating head which has a larger width than the first rotating head and which traces recording tracks one after another alternately with the first rotating head. The apparatus alos includes detecting means for detecting the positional errors of the first and second rotating heads relative to one of the recording tracks by using the outputs of these heads and adjusting means for adjusting, on the basis of the difference in head width between the first and second rotating heads, the output of the detecting means related to the second rotating head. The apparatus may further include recording medium moving mens for moving the recording medium in a direction intersecting the recording tracks and control means for controlling the moving means on the basis of the output of the detecting means adjusted by the adjusting means.

These and further objects and features of the present invention will become apparent from the following detailed description of the preferred embodiments thereof taken in conjunction with the accompanying drawings.

BREIF DESCRIPTION OF THE DRAWINGS

FIGS. 1(A) and 1(B) are schematic illustrations showing the allocation of two heads in relation to the recording track during a VTR reproducing operation in accordance with the present invention in an embodiment thereof.

FIG. 3 is an illustration showng by way of example, the spectrum of a signal recorded on a magnetic recording tape.

Figure 4:
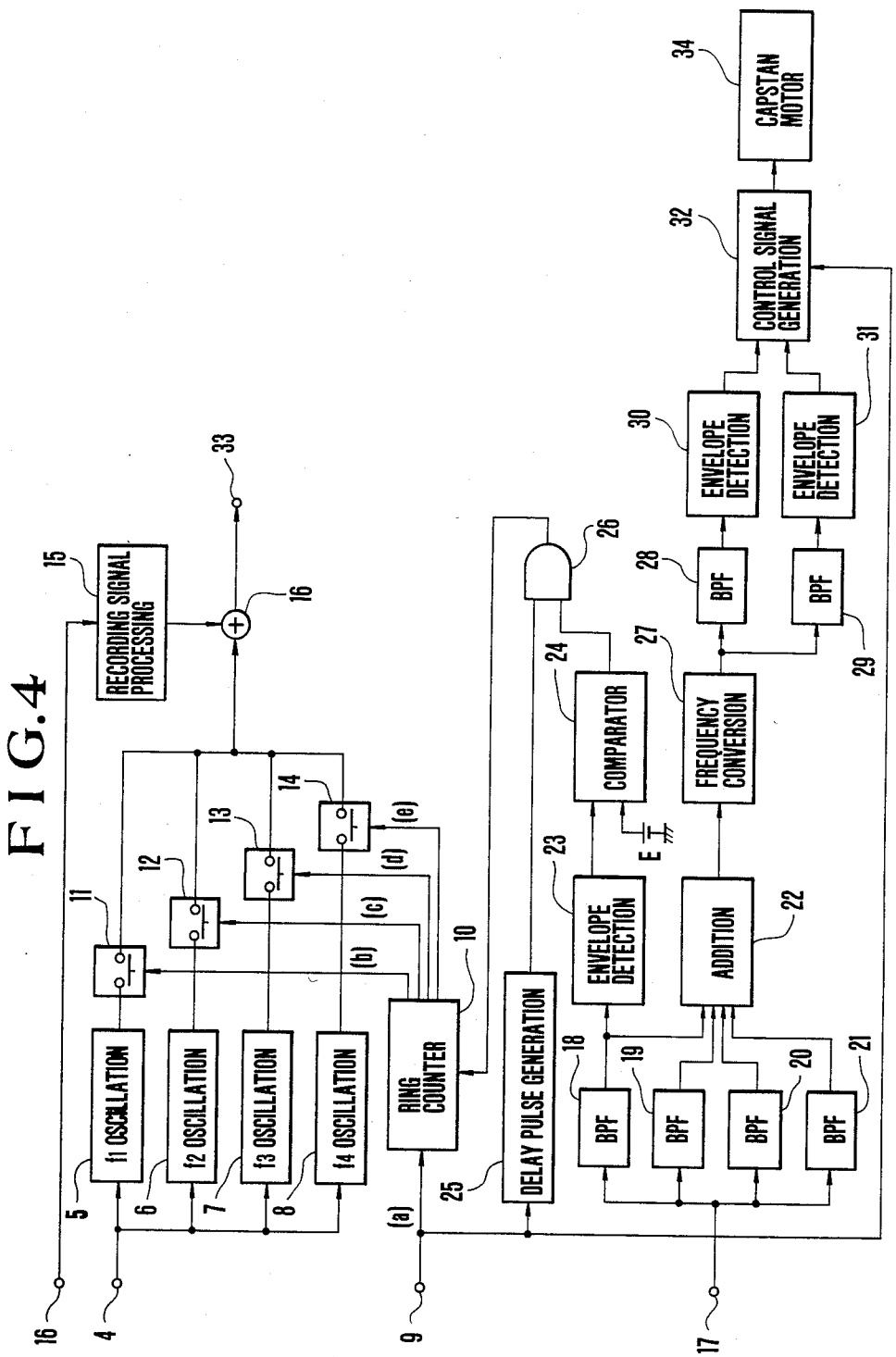
FIG. 4 is a block diagram showing the arrangement of the essential parts of a VTR in accordance with the invention in a preferred embodiment thereof.

FIGS. 5(a), 5(b), 5(c), 5(d) and 5(e) are timing charts showing the operation of the essential parts shown in FIG. 4.

Figure 6:
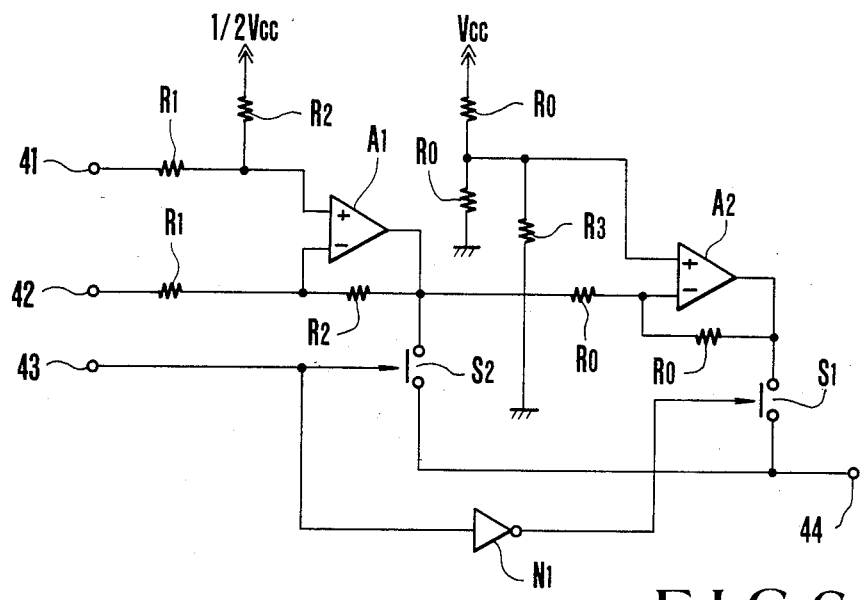

FIG. 6 is a cricuit diagram showing, by way of example, the arrangement of a control signal generating circuit shown in FIG. 4.

Figure 7:
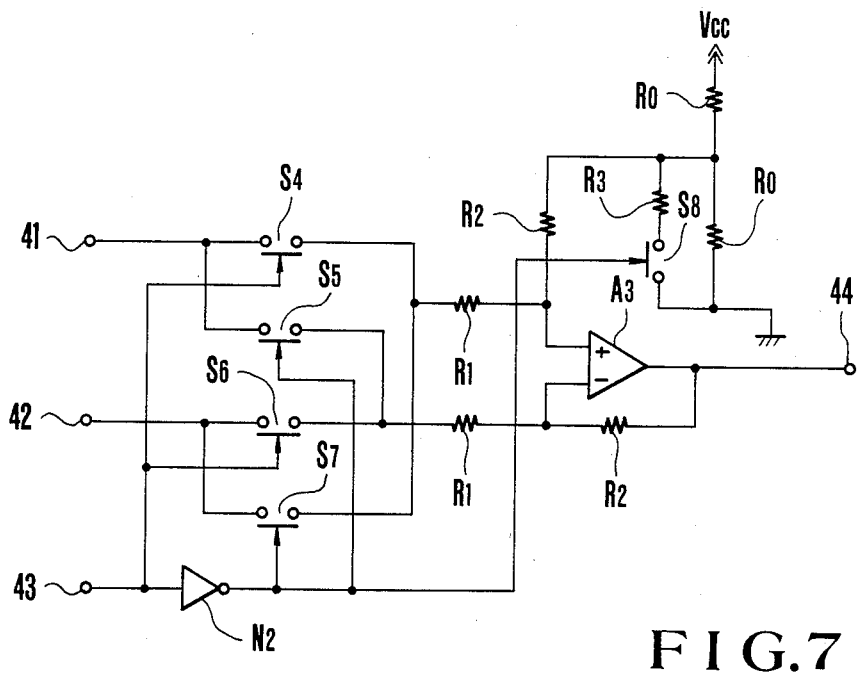

FIG. 7 is a circuit diagram showing another example of an arrangement of the control signal generating circuit shown in FIG. 4.

DETAILED DESCRIPTION OF THE PREFERRED EMBODIMENTS

Figure 1A:
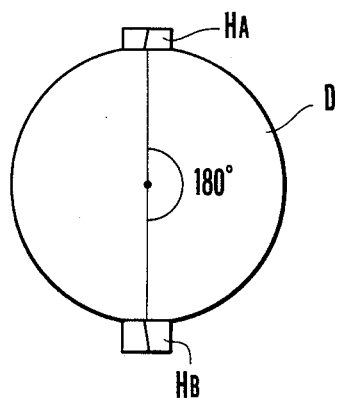
Figure 1B:
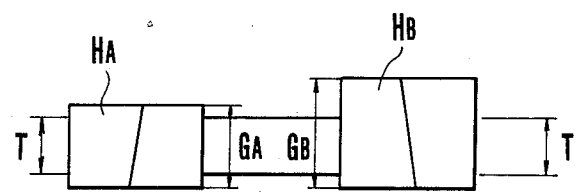

FIGS. 1(A) and 1(B) schematically show the allocation of two rotary heads HA and HB in relation to the recording track during a reproducing operation of a VTR, in accordance with the invention in an embodiment thereof. Referring to FIG. 1(A), the two rotary heads HA and HB are attached to a rotary head drum assembly D. The head HA has a narrow head width while the head HB has a wide head width. The heads HA and HB have different azimuth angles. In FIG. 1(B), a reference symbol GA identifies the head width of the head HA; the reference symbol GB identifies that of the head HB; and T identifies the width of a recording track.

In the VTR of this embodiment, as will be further described later, tracking control at the reproduction time is accomplished with the heads HA and HB having their one end surfaces aligned in their travelling direction. The control is performed in such a way that the controlled system is not varied by these heads HA and HB. Furthermore, in this instance, as shown in FIG. 1(B), the center of the narrower head HA traces the center line of the recording track giving a satisfactory reproduced video signal.

Figure 2:
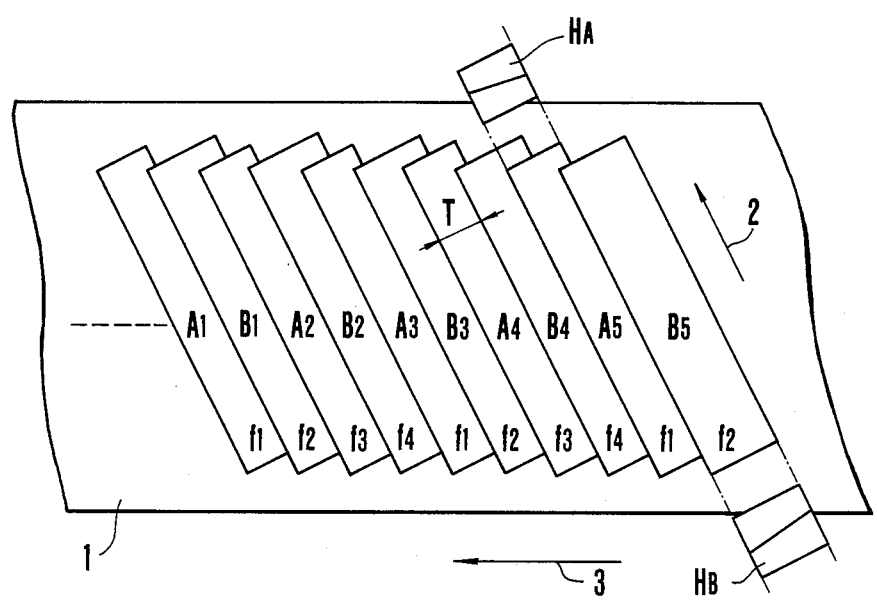
FIG. 2 is an illustration showing recording being performed by the VTR in an embodiment of the invention.

FIG. 2 shows the recording condition by the VTR of FIG. 1. In FIG. 2, the following reference numerals respectively identify 1 a magnetic tape; 2 an arrow showing the travelling direction of the heads HA and HB; and 3 an arrow showing the travelling direction of the magnetic tape 1. As shown, the heads HA and HB record a video signal on the magnetic tape 1 forming recording tracks A1, B1, A2, B2, A3, ... one after another. In this instance, the tracks A1, A2, A3, ... have the same width as the tracks B1, B2, B3, ... but different azimuth angles. Meanwhile, in these recording tracks A1, B1, A2, B2, A3, there are overlapping recorded on the video signal pilot signals of the frequencies F1–F4, as shown in the drawing. Assuming that the frequency f1 = 60 KHz, f2 = 70 KHz, f3 = 100 KHz and f4 = 90 KHz, pilot signals of the frequency f1 or f3 are recorded in the recording tracks formed by the head HA while pilot signals of the frequency f2 or f4 are recorded in the tracks formed by the head HB.

When the tracks A1, B1, A2, B2, A3, thus recorded are reproduced with the heads HA and HB, the pilot signals that are then reproduced are signals overlappingly recorded in adjacent tracks both in front and in back of a track mainly traced (hereinafter of called the main track) by the heads HA and HB reproduction of the video signal recorded therein. Since the frequency of the pilot signals in the adjacent tracks is low although the azimuth angle differs, the pilot signals can be reproduced without substantially depleting their gains. FIG. 3 shows, by way of example, the frequency spectrum of a composite signal consisting of the video signal recorded on the magnetic tape 1 and the pilot signals which are also recorded there. In FIG. 3, a reference symbol Y identifies the spectrum of a luminance signal; C identifies that of a chromaticity signal; and F1-F4 respectively denote those of the pilot signals.

When the head HA is reproducing the track A1 of FIG. 2, for example, a pilot signal of the frequency f1 is reproduced from the main track and pilot signals with frequencies of f4 and f2 are reproduced from the two adjacent tracks. When the recording track B1 of FIG. 2 is reproduced by the other head HB, a pilot signal of the frequency f2 is reproduced from the main track and pilot signals of the freqencies f1 and f3 are reproduced from the two adjacent tracks. These frequencies f1-f4 have the following relation:

$$|f1-f2| = |f3-f4| = 10 \text{ KHz}$$

$$|f2-f3| = |f4-f1| = 30 \text{ KHz}$$

In other words, when the reproduced pilot signal component is frequency converted using a reference signal of the same frequency as the pilot signal of the main track, the output of the difference component obtained by frequency conversion becomes two kinds of components, 10 KHz and 30 KHz. If the head HA deviates toward the track B1 when the head HA is reproducing the track A1, for example, the 10 KHz component increases. If the opposite head HB deviates, the 30 KHz component increases. Furthermore, if the head HB deviates toward the track A2 while the track B1 is being reproduced, the 30 KHz component increases. Then, if the opposite head HA deviates, the 10 KHz component increases. Then, the 10 KHz component and the 30 KHz component are respectively extracted via band pass filters BPF to obtain a tracking error signal. The travel of the tape 1 is controlled by a capstan motor 34 or the like based on the tracking error signal, so that the positions of the tape 1 and the head HA or HB can be controlled relative to each other.

The essential parts of a VTR according to the invention in an embodiment thereof are arranged as shown in FIG. 4. Referring to FIG. 4, the embodiment includes an input terminal 4 for a horizontal synchronizing signal fH; oscillators 5, 6, 7 and 8 which respectively produce pilot signals f1, f2, f3 and f4; an input terminal 9 for receiving a known 30 Hz head switch-over signal (known as 30-PG); a ring counter 10 having four count periods; analog switches 11, 12, 13 and 14; a recording signal processing circuit 15 to process a video signal for recording it on the magnetic recording tape 1; a mixer 16; an input terminal 17 for receiving a composite signal reproduced from the tape 1; the band pass filters (hereinafter called BPF) which respectively take out the pilot signals f1, f2, f3 and f4; an adder 22; an envelope detection circuit 23; a comparator 24; a delay pulse circuit 25 which produces a delay pulse from the lead switch-over signal 30-PG; and AND gate 26; a frequency conversion circuit 27; band pass filters BPF's 28 and 29; envelope detection circuits 30 and 31; a control signal generating circuit 32; and the capstan motor 34 for moving the magnetic recording tape 1.

The operation of the VTR at the recording time is as follows: The horizontal synchronizing signal fH taken from a video signal system of the VTR is supplied to the horizontal synchronizing signal input terminal 4. With this signal used to obtain a reference phase, the phase locked pilot signals f1, f2, f3 and f4 are generated by the oscillators 5, 6, 7 and 8. The four pilot signals f1, f2, f3 and f4 are constantly generated. The ring counter 10 then generates pulses of four phases obtained by frequency dividing the 30-PG switch-over signal. The operation timing of parts (a), (b), (c), (d) and (e) shown in FIG. 4 is shown in FIGS. 5(a), 5(b), 5(c), 5(d) and 5(e). The pulses of the above four phases are represented by FIGS. 5(b)-5(e). The analog switches 11, 12, 13 and 14 are operated to record the pilot signals of f1, f2, f3 and f4 on the magnetic tape 1, one for each recording track A1, B1, A2, B2, A3. The ring counter 7 causes the four count periods of the four pilot signals f1, f2, f3 and f4 to begin with the pilot signals f1.

The video signal coming from the recording signal processing circuit 15 is mixed with the pilot signals f1, f2, f3 and f4 at the mixer 16 to obtain a composite signal. The composite signal thus obtained is supplied via the terminal 33 to the heads HA and HB to be recorded on the magnetic recording tape 1.

For reproduction, the VTR according to the invention operates as follows: When a reproduced composite signal is supplied from the heads HA and HB via the terminal 17, the pilot signals f1, f2, f3 and f4 are eliminated by the band pass filters BPF's 18, 19, 20 and 21 and are applied to the adder 22. Meanwhile, the output of the band pass filters, BPF 18, which eliminates the pilot signal f1 is detected at the envelope detection circuit 23. The output of the envelope detection circuit 23 is then compared with a reference voltage E at the comparator 24 to determine whether or not the pilot signal f1 represents a recorded field. In this manner, the phases of the four phase pulses are reset every time the pilot signal with the frequency f1 is reproduced. In other words, a signal which is always of the same frequency as the pilot signal f1, f2, f3 and f4 recorded in the main track, is applied to the frequency converter 27. From the signal frequency converted by the frequency converter 27 are obtained the 10 KHz frequency component and the 30 KHz frequency component which are respectively separated via the band pass filters BPF's 28 and 29. These components are then detected by the envelope detection circuits 30 and 31. Signals produced from the envelope detection circuits 30 and 31 are respectively supplied to the control signal generating circuit 32. The control signal generating circuit 32 then produces an automatic tracking control signal to control the capstan motor 34. The capstan motor 34 in turn controls the travel of the magnetic tape 1. This circuit 32 is arranged as follows:

FIG. 6 shows, by way of example, the arrangement of the above control signal generating circuit 32. In FIG. 6, reference numerals 41 and 42 respectively identify input termianls which receive the signals produced from the envelope detection circuits 30 and 31. Another input terminal 43 receives the head switch-over 30-PG. Let us assume that input voltages supplied to the input terminals 41 and 42 are V1 and V2. The reference symbols R0–R3 identify resistors; S1 and S2 identify switches; N1 identifies an inverter; A1 and A2 identify differential amplifiers; and Vcc identifies a reference voltage.

Each of the voltages V1 and V2 is supplied via the resistor R1 to the first differential amplifier A1. The positive input terminal 41 of the first differential amplifier A1 is connected via the resistor R2 to ½ Vcc while the negative input terminal 42 is connected via the resistor R2 to the output terminal of the amplifier A1. Furthermore, the input of the negative input terminal 42 of the amplifier A1 is also produced from a terminal 44 via the switch S2 operated by the head switch-over signal 30-PG and, at the same time produced at the negative input terminal of the second differential amplifier A2 via the resistor R0. The positive input terminal of the amplifier A2 receives a voltage which is obtained by dividing the reference voltage Vcc with the resistors R0 and R3, etc. The output of the amplifier A2 is produced via the switch S1 at the terminal 44. Assuming that the output of the amplifier A1 is V3, there is obtained the following formula:

$$\frac{R2\ V2 + R1\ V3}{R1 + R2} = \frac{\frac{1}{2} R1\ Vcc + R2\ V1}{R1 + R2} \tag{1}$$

which becomes:

$$V3 = R2/R1\ (V1 - V2) + \tfrac{1}{2} Vcc\ Tlm \tag{2}$$

Meanwhile, assuming that the voltage of the output of another amplifier A2 is V4 and the voltage of the non-inversion input terminal thereof is XVcc, there is obtained the following formula:

$$\frac{R0\ V4 + R0\ V3}{R0 + R0} = XVcc \tag{3}$$

which becomes:

$$V4 = 2XVcc - V3 = \frac{R2}{R1}(V2 - V1) + (2X - \tfrac{1}{2})Vcc \tag{4}$$

When the centers of the heads HA and HB are arranged to trace the center line of the recording track, the value of X is ½. In that instance, there is obtained the following formula:

$$V4 = R2/R1(V2 - V1) + \tfrac{1}{2} Vcc \tag{5}$$

In that instance, the control signal produced from the output terminal 44 changes between V3 of Formula (2) and V4 of Formula (5) at every field. In other words, V3 is produced for one field and V4 for another field adjacent to the first field. This is because the generating direction of the 10 KHz and 30 KHz pilot signal components is inverted at every field, as has been mentioned in the foregoing. Then, the output control signal becomes ½Vcc when V1=V2 and the operation of the control system becomes stable.

In the example shown in FIG. 6, there is obtained X=R3/(2R3+R0) and X thus becomes smaller than ½ when the switch S1 is on and the switch S2 is off. This means that the operation of the control system remains stable even in the event that the head HB is in the condition shown in FIG. 1(B). In FIG. 6, the switch S2 is on while the recording track is traced by the head HA. Then, the control signal produced, when the head HA is tracing, becomes as shown in Formula (2). In other words, the control system becomes stable at the time when V1=V2. When the recording track is being traced by the head HB, on the other hand, the control signal produced from the circuit becomes that shown in Formula (4). In this instance, the value of X, that is, the value of the resistors R0 and R3 is determined so that the control signal becomes ½Vcc when the value of V2 becomes b/aV1. Thus, in accordance with the embodiment, the control system becomes stable when the recording track is traced by the head HB under the condition shown in FIG. 1(B).

In accordance with the arrangement described above, the control system can be stabilized in the same manner as the controlling object can be stabilized by the arrangement. Furthermore, the recording track can be stably traced by the two heads HA and HB under the condition shown in FIG. 1(B).

FIG. 7 shows another example of arrangement of the control signal generating circuit. In FIG. 7, the input and output terminals are identified by the same reference numerals as those used in FIG. 6. The circuit arrangement in FIG. 7 includes the resistors R0–R3; switches S4–S8; an inverter N2; and a differential amplifier A3. In this situation, when the recording track is being traced by the head HA, the switches S4 and S5 are turned on by the head switch-over signal 30-PG and the control signal produced Vout is expressed by the following formula:

$$Vout = R2/R1(V1-V2) + \tfrac{1}{2}Vcc \qquad (6)$$

When the recording track is being traced by the other head HB on the other hand, the control signal Vout is expressed by the following formula:

$$Vout = R2/R1(V2-V1) + (2X-\tfrac{1}{2})Vcc(X = R3/2R + R0) \qquad (7)$$

In either instance, the same output as that of the circuit of FIG. 6 can be obtained. Therefore, the same advantageous effect of FIG. 6 can be obtained by the arrangement of FIG. 7.

The video signal reproducing apparatus according to the present invention, described in the embodiments in the foregoing, eliminates the possibility of the recording medium moving system becoming unstable due to the difference in head width or rotating surface between the two heads HA and HB and thus enables the two heads HA and HB to satisfactorily reproduce a video signal.

What we claim:

1. A video signal reproducing apparatus for reproducing a video signal from many recording tracks formed on a recording medium with even spacing, said apparatus comprising:
   (a) a first rotating head;
   (b) a second rotating head which has a larger head width than the first rotating head and is arranged to trace the recording tracks one after another alternately with the first rotating head;
   (c) detecting means for detecting the positional errors of the first and second rotating heads relative to one of the recording tracks by using the outputs of the first and second rotating heads;
   (d) adjusting means for adjusting the output of said detecting means related to the second rotating head on the basis of difference in head width between the first and second rotating heads;
   (e) recording medium moving means for moving the recording medium in the direction intersecting the recording tracks; and
   (f) control means for controlling the moving means on the basis of the output of said detecting means adjusted by said adjusting means.

2. An apparatus according to claim 1, wherein each of said recording tracks has one of pilot signals of four different frequencies recorded therein in such a way as to be superimposed on a video signal recorded there to form a composite signal for each of said tracks one after another; and said detecting means includes a circuit which separates each of said pilot signals of four different frequencies from said composite signal.

3. An apparatus according to claim 2, wherein said detecting means further includes a circuit arranged to detect the levels of two of said pilot signals recorded in two adjacent recording tracks on both sides of a track being mainly traced by said first or second rotating head.

4. An apparatus according to claim 3, wherein said detecting means further includes a comparison circuit arranged to compare with each other the levels of the two pilot signals detected by said level detection circuit.

5. An apparatus according to claim 4, wherein said adjusting means is arranged to adjust the signal processing characteristic of said comparison circuit.

6. A video signal reproducing apparatus for reproducing a video signal from many recording tracks formed on a recording medium with even spacing, said apparatus comprising:
   (a) a rotary head drum assembly provided with first and second heads arranged to rotate with their rotating phase differing 180° from each other, the rotating surfaces at the centers of the head widths of said heads being arranged to deviate in the direction of axis of rotation;
   (b) detecting means for detecting the positional errors of said first and second heads relative to one of said recording tracks by using the outputs of said first and second heads;
   (c) adjusting means for adjusting the output of said detecting means related to the second head on the basis of the extent of said deviation of the rotating surfaces;
   (d) recording medium moving means for moving said recording medium in the direction intersecting said recording tracks; and
   (e) control means for controlling said moving means on the basis of the output of said detecting means adjusted by said adjusting means.

7. An apparatus according to claim 6, wherein each of said recording tracks has one of pilot signals of four different frequencies recorded therein in such a way as to be superimposed on a video signal recorded there to form a composite signal for each of said tracks one after another; and said detecting means includes a circuit which separates each of said pilot signals of four different frequencies from said composite signal.

8. An apparatus according to claim 7, wherein said detecting means further includes a circuit arranged to detect the levels of two of said pilot signals recorded in two adjacent recording tracks on both sides of a track being mainly traced by said first or second rotating head.

9. An apparatus according to claim 8, wherein said detecting means further includes a comparison circuit arranged to compare with each other the levels of the two pilot signals detected by said level detection circuit.

10. An apparatus according to claim 9, wherein said adjusting means is arranged to adjust the signal processing characteristic of said comparison circuit.

11. A video signal recording and reproducing apparatus, comprising:
(a) a first rotating head;
(b) a second rotating head which has a larger head width than said first rotating head and is arranged to record in conjunction with said first rotating head a video signal forming many recording tracks at even spacing intervals on a recording medium;
(c) detecting means for detecting the positional errors of the first and second rotating heads relative to one of said recording tracks by using the outputs of the first and second rotating heads when these outputs are in a reproduced state;
(d) adjusting means for adjusting one of the outputs of said detecting means related to the output of the second rotating head to bring the output closer to another output which is related to that of said first rotating head;
(e) recording medium moving means for moving the recording medium in the direction intersecting the recording tracks; and
(f) control means for controlling the moving means on the basis of the output of said detecting means adjusted by said adjusting means.

12. An apparatus according to claim 11, further comprising:
generating means for generating pilot signals of four different frequencies.

13. An apparatus according to claim 12, further comprising:
mixing means for mixing said pilot signals of four different frequencies with said video signal to obtain a composite signal, said mixing means being arranged to supply said composite signal to said first and second rotating heads.

14. An apparatus according to claim 13, wherein said detecting means includes a separating circuit which separates said pilot signals of four different frequencies from the composite signal reproduced by said first and second rotating heads.

15. An apparatus according to claim 14, wherein said detecting means further includes a circuit arranged to detect the levels of two of said pilot signals recorded in two adjacent recording tracks on both sides of a track being mainly traced by said first or second rotating head.

16. An apparatus according to claim 15, wherein said detecting means further includes a comparison circuit arranged to compare with each other the levels of the two pilot signals detected by said level detection circuit.

17. An apparatus according to claim 16, wherein said adjusting means is arranged to adjust the signal processing characteristic of said comparison circuit.

18. An information signal reproducing apparatus for reproducing information signals from recording tracks formed on a record bearing medium, said apparatus comprising:
(a) a first head;
(b) a second head which has a larger head width than the first head and is arranged to trace the recording tracks one after another alternately with the first head;
(c) detecting means for detecting the positional errors of the first and second heads relative to one of the recording tracks by using outputs of the first and second rotating heads;
(d) adjusting means for adjusting an output of said detecting means related to the second head on the basis of the difference in head width between the first and second heads; and
(e) control means for controlling the positions of said first and second heads relative to the record bearing medium on the basis of the output of said detecting means adjusted by said adjusting means.

19. An information signal reproducing apparatus for reproducing information signals from recording tracks formed on a record bearing medium, said apparatus comprising:
(a) a rotary head drum assembly having an axis of rotation and provided with first and second heads arranged to rotate with their rotating phase differing 180° from each other, the rotating surfaces at the centers of the head width of said heads being arranged to deviate in the direction of the axis of rotation;
(b) detecting means for detecting the positional errors of said first and second heads relative to one of said recording tracks by using the outputs of said first and second heads;
(c) adjusting means for adjusting an output of said detecting means related to the second head on the basis of the extent of said deviation of the rotating surfaces; and
(d) control means for controlling positions of said first and second heads relative to recording medium on the basis of the output of said detecting means adjusted by said adjusting means.

* * * * *